UNITED STATES PATENT OFFICE.

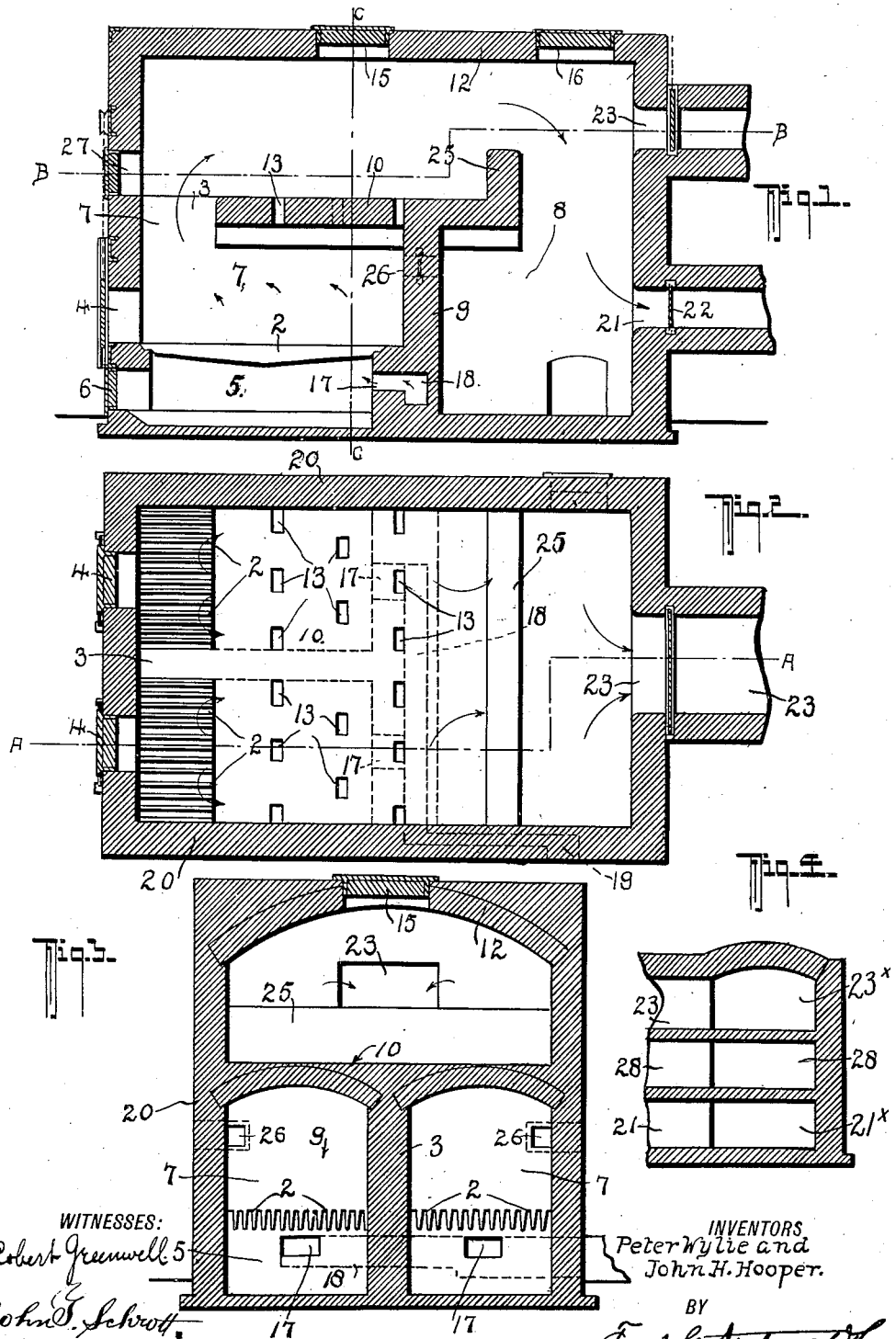

PETER WYLIE AND JOHN H. HOOPER, OF VANCOUVER, BRITISH COLUMBIA, CANADA.

GARBAGE-DESTROYING FURNACE.

1,064,414.

Specification of Letters Patent.  Patented June 10, 1913.

Application filed November 26, 1912. Serial No. 733,619.

*To all whom it may concern:*

Be it known that we, PETER WYLIE and JOHN H. HOOPER, citizens of the Dominion of Canada, residing at Vancouver, in the Province of British Columbia, Canada, have invented a new and useful Garbage-Destroying Furnace, of which the following is a specification.

This invention relates to a garbage destructor furnace of that class which is used to deal with the garbage of a city, and the object has been to provide a means within the furnace for the drying of any moist material prior to combustion and for the separate combustion of easily combustible material. In destructor furnaces of this class, if the material as collected is indiscriminately delivered on to its grate a mass of moist material may interfere with the combustion of the furnace for a considerable time and the duty performed is in consequence irregular and unsatisfactory. This objection we overcome in the invention which is the subject of this application, by providing a drying hearth which is projected over the furnace grate and the combustion chamber, over and through which hearth the products of combustion from the furnace grate must pass on their way to the chimney flue, whereby the material on the hearth is dried out and may thereafter be raked on to the furnace grate beneath.

The invention also provides a separate delivery aperture into the combustion chamber of the furnace so that any readily combustible material may be deposited directly into it that the flame from it may consume any gases and vapors which may pass unconsumed from the grate and drying hearth.

The invention also comprises other features of improvement to which attention will be drawn in the following specification, reference being made to the drawings by which it is accompanied, in which:

Figure 1 is a vertical longitudinal section through the furnace on the line A in Fig. 2. Fig. 2, a sectional plan on the line B in Fig. 1. Fig. 3, a vertical cross section on the line C in Fig. 1. Fig. 4 is a cross section of the combined flue showing the air duct interposed.

In these drawings 2 represents the main grates of the furnace which are preferably separated from one another by a dividing wall 3 and are provided with separate doors 4 for stoking and ash-pits 5 beneath having doors 6 for the removal of the ashes.

The furnace chambers 7 and their ash-pits are separated from the combustion chamber 8 by a wall 9 which is carried above the grate level to the level of a drying hearth 10 which is carried across the width of both furnaces. This drying hearth 10 extends toward the front over the furnace grates 2 and backward over the combustion chamber 8 at which end it is provided with a bridge wall 25 projecting a short distance upward toward the roof 12 of the furnace. The hearth is provided with apertures 13 communicating with the furnace chamber 7. Closable charging openings 15 and 16 are provided in the roof 12, over the drying hearth 10 and over the combustion chamber 8.

Air for combustion on the grates is delivered to beneath them through delivery apertures 17 in the wall 9 at the back of the ash-pit and the products of combustion are normally delivered to the chimney through a flue 21 provided with a damper 22, but a supplementary flue 23 is provided delivering direct to the chimney at a level above the top of the bridge wall 25, which supplementary flue is also provided with a damper. This supplementary flue is to provide a direct passage for the cold air admitted through either of the charging openings 15 or 16 or the opening 27, when opened, to deliver material or to stoke what is on the hearth 10, so that the heat of the combustion chamber will not be lowered by the passage of cold air through it.

Where the furnace stands alone the air for combustion is derived as shown in Figs. 1, 2 and 3 of the drawings, through a lateral opening 19 in one of the side walls 20, and passes through a duct 18 in the side wall 20 and dividing wall 9, so as to derive heat from its exposure thereto.

Where the furnace forms one of a series, the main and supplementary chimney flues 21 and 23 deliver into a main flue 21×—23× which runs across the ends of the furnaces and between these flues is an air duct 28 through which the air for combustion in the several furnaces may be drawn (see Fig. 4).

Each furnace chamber 7 is provided with a direct passage 26 through the wall 9 to the combustion chamber 8, which passages are closable with dampers and are only designed to be opened when fire is being kindled on the grates 2.

In use, fires having been kindled on the grates 2, the direct passages 26 to the combustion chamber 8 are closed, and the furnace gases pass through and over the material which has been charged on to the drying hearth 10 and the vapors and gases pass therefrom into the combustion chamber 8 in which any light combustible material, such as packing cases, has been kindled, and finally pass to the chimney through the main flue 21. When the material on the drying hearth 10 has been sufficiently dried out it is raked over the front edge of the hearth on to the grates 2 where it is consumed, and a fresh supply is charged on to the hearth.

As before explained, when the door 15 is opened to charge material on to the hearth 10 or when the door 27 is open to rake the material therefrom on to the grates 2, the supplementary flue 23 should be opened and as this flue is more direct and at a higher level than the main flue the incoming cold air will not pass through the combustion chamber 8 but will pass direct to the chimney.

The important features of the invention are the drying hearth projected over the furnace grates and over the combustion chamber; the supplementary flue direct to the chimney from the level of the drying hearth; the separate charging apertures for moist and dry material and the supplementary closable apertures communicating from the furnace chamber direct to the combustion chamber.

Having now particularly described our invention, we hereby declare that what we claim as new and desire to be protected in by Letters Patent, is:

1. A garbage burning furnace comprising outer walls inclosing an internal chamber, a wall extending transversely of the chamber and extending from the bottom of the chamber toward the top, a second wall within the chamber extending from said transverse wall, in a longitudinal plane, to the front wall, said inner walls dividing said chamber into three distinct lower sections, a drying hearth consisting of a horizontal wall extending from one side to the other of the furnace and located at the upper extremity of said transverse and longitudinal dividing walls, said horizontal wall terminating short of the front and back walls of the furnace to leave passage ways, and furnace grates in the two chambers formed by said transverse and longitudinal dividing walls, said grates projecting beneath said drying hearth, and offtake flues for said furnace, said offtake flues leading from the furnace to the rear of the drying hearth or transverse wall.

2. A garbage burning furnace comprising an outer wall inclosing a chamber, a transverse partition within said chamber and extending from one side wall to the other and approximately half way up the height of the chamber, a correspondingly extending longitudinal partition wall in said furnace chamber, said transverse and longitudinal walls dividing said furnace chamber into two distinct combustion spaces, grates within said combustion spaces and a drying hearth arched over said grates and supported by said longitudinal and transverse dividing walls, said hearth terminating short of the front wall of the furnace to leave a fire and smoke passage and terminating short of the rear wall of the furnace to leave a corresponding passage, offtake flues from the furnace chamber leading from the furnace chamber to the rear of the drying hearth or transverse wall and air inlet flues delivering beneath the grates, said outer wall having a door in its front wall portion in alinement with the top of the drying hearth through which the contents of the hearth may be raked, and a door in the top of said outer wall through which the materials may be deposited on said hearth, said outer wall having charging openings for said grates substantially as shown.

In testimony whereof we have signed our names to this specification in the presence of two subscribing witnesses.

PETER WYLIE.
JOHN H. HOOPER.

Witnesses:
ROWLAND BRITTAIN,
MAY WHYTE.